United States Patent Office 3,284,207
Patented Nov. 8, 1966

3,284,207
PHOTOGRAPHIC LIGHT-SENSITIVE MATERIALS
John Peter Stonham, Ilford, England, assignor to Ilford Limited, Ilford, England, a company of Great Britain
No Drawing. Filed Mar. 11, 1963, Ser. No. 264,073
Claims priority, application Great Britain, Mar. 29, 1962, 12,114/62
2 Claims. (Cl. 96—114)

This invention relates to the production of photographic light-sensitive materials, and more particularly to the production of light-sensitive silver halide photographic emulsions.

The vast majority of photographic silver halide emulsions are made in a medium of gelatin as suspending agent for the silver halide grains, gelatin having been found to be a material of exceptional quality in providing emulsions of high photographic speed. Nevertheless, since gelatin is a natural product and therefore subject to considerable variation in properties, efforts have been made over many years to find some suitable alternative material which could be produced synthetically under conditions of control which would lead to a uniform and consistent product.

The search for alternatives has been largely carried out in the field of synthetic polymers, but no major success has been achieved. Among the polymers which have been suggested for the purpose is polyacrylamide, and while this material does enable practical emulsions to be made, it is found that when silver halide is formed in a medium consisting essentially of it, the most desirable crystal form of the silver halide, from the photographic standpoint which consists essentially of flat tabular plates, is not obtained.

It has now been found, as a result of further research and experimentation, that polymers of particular value as media for silver halide photographic emulsions may be obtained by subjecting a polyacrylamide to treatment to convert 2 to 20% of the amide groups present therein to amino groups. The preferred polymers have a viscosity comparable with that of gelatin. Such polymers when present at the stage of the initial precipitation of the silver halide compare favourably with gelatin in affording the most desirable crystal structure of the silver halide, as noted above.

The following is exemplary of the production of a synthetic polymer for use in this invention:

50 gm. acrylamide are dissolved in distilled water and made up to 500 ml.; 2.0 ml. 30% hydrogen peroxide are added and the temperature raised to 90° C. The solution is then heated on the water bath for two hours; at the end of this time it is precipitated by pouring into 1.5 litres ethanol, shredding, and washing again with a further 500 ml. ethanol. The polyacrylamide obtained is then dried at room temperature.

20 gm. of the polyacrylamide are dissolved in distilled water and the volume adjusted to 400 ml. The temperature is raised to 25° C. and 45 ml. 5.85% sodium hypochlorite solution and 11.3 gm. sodium hydroxide, both dissolved together in 600 ml. water also at 25° C., are added with vigorous stirring. The mixture is kept in a thermostat at 25° C. for one hour and then it is rapidly heated to 65° C. on the water bath and immediately cooled again; it is neutralised by the addition of approximately 55 ml. 5 N sulphuric acid. The polymer is precipitated by the careful addition of 1–1.5 litres ethanol, washed with a further 500 ml. ethanol and dried at room temperature.

In the foregoing process the quantity of hypochlorite used is that theoretically sufficient to convert 12.5% of the amide groups to amino groups. The brief heat treatment at the end of the reaction is given to ensure hydrolysis of any residual intermediate isocyanate which might otherwise cause insolubilisation of the polymer when it is precipitated from solution. It has been noted that due to the alkaline reaction medium some hydrolysis of unconverted amide groups to carboxy groups occurs.

The polymers may be used for the preparation of photographic silver halide emulsions, using the polymer as a total or partial replacement of gelatin, in any process of emulsion making known per se, and thus serve to afford the silver halide (chloride, bromide, chlorobromide or iodobromide) in the desirable flat tabular crystal form.

It has been found preferable, using a polymer prepared as above, to include some gelatin in the emulsions. The gelatin may be included at an early stage in the emulsion making process, or may be added at a final stage. When the latter technique is employed, effects due to trace impurities in gelatin may be substantially or wholly avoided.

The following examples, which each employ the polymer prepared by the specific process set forth above, will serve to illustrate the invention:

Example 1

Solution A at 52° C.:
 Water _____ ml__ 283
 Polymer _____ gm__ 2.5
Solution B at 52° C.:
 2.5 N ammonium bromide _____ ml__ 177
 1.2 N potassium iodide _____ ml__ 10.6
 Water _____ ml__ 25
Solution C at 32° C.:
 2.5 N silver nitrate _____ ml__ 150
 Water _____ ml__ 62

Solutions B and C were run simultaneously into Solution A in 30 seconds with mechanical stirring. The emulsion was ripened for 80 minutes at 125° F. and then coagulated by the addition of 600 gm. sodium sulphate. The solution was decanted, and the coagulate dispersed in 50 gm. gelatin in 250 ml. water, set, shredded and washed.

Example 2

Solution A at 52° C.:
 2.5 N ammonium bromide _____ ml__ 162
 1.2 N ammonium iodide _____ ml__ 9
 Polymer _____ gm__ 2.5
 Water _____ ml__ 223
Solution B at 32° C.:
 2.5 N silver nitrate _____ ml__ 75
 Ammonium hydroxide S.G.O. 920 _____ ml__ 35.5
Solution C at 32° C.:
 2.5 N silver nitrate _____ ml__ 75
 Water _____ ml__ 83

Solution B was run into Solution A in 30 seconds with mechanical stirring, and after allowing the mixture to stand for one minute Solution C was added. After ripening for 80 minutes at 125° F., 80 ml. 5 N sulphuric acid and 400 gm. sodium sulphate were added to coagulate the emulsion. After decantation the coagulate was dispersed in 50 gm. gelatin in 250 ml. water, set, shredded and washed.

Example 3

Solution A at 52° C.:
 2.5 N ammonium bromide _____ ml__ 262.5
 1.2 N potassium iodide _____ ml__ 6
 Polymer _____ gm__ 2.5
 Water _____ ml__ 294
Solution B at 32° C.:
 Ammonium hydroxide S.G.O. 920 _____ ml__ 40.5
Solution C at 32° C.:
 2.5 N silver nitrate _____ ml__ 150
 Water _____ ml__ 225

Solution B was added to Solution A and Solution C was run into the mixture in one minute with mechanical stirring. After ripening for 80 minutes at 125° F., 80 ml. 5 N sulphuric acid and 400 gm. sodium sulphate were added to coagulate the emulsion. After decantation the coagulate was redispersed in 50 gm. gelatin in 250 ml. water, set, shredded and washed.

*Example 4*

The procedure in Example 3 was followed except that the composition of Solution A was as follows:

Solution A at 52° C.:

| | | |
|---|---|---|
| 2.5 N ammonium bromide | ml | 75 |
| 2.5 N ammonium chloride | ml | 187.5 |
| Polymer | gm | 2.5 |
| Water | ml | 294 |

The ripening time was reduced to 20 minutes, but otherwise the procedure was the same as in Example 3.

Further tests were made using a variety of polymers obtained by the foregoing procedure but in which, in the treatment of the polyacrylamide, the degree of conversion to amino groups was varied from 5 to 20% and the quantity of sodium hydroxide was varied from 0.15 to 1.5 mol equivalents per mol of acrylamide (calculated as monomer), a wide variety of polymers being thus obtained. It was found that each of them when employed for the production of emulsion as set forth in any of Examples 1–4 afforded closely similar results.

I claim as my invention:
1. A photographic colloid silver halide emulsion in which the colloid consists at least in part of a polyacrylamide in which 2 to 20% of the amide groups have been converted to amino groups.
2. A photographic emulsion according to claim 1 wherein the colloid is a mixture of gelatin and a said polyacrylamide containing amino groups.

References Cited by the Examiner
UNITED STATES PATENTS

| | | | |
|---|---|---|---|
| 2,533,166 | 12/1950 | Jones. | |
| 2,729,560 | 1/1956 | House et al. | 260—89.7 |
| 2,811,494 | 10/1957 | Smith et al. | |

OTHER REFERENCES

Neblett: Photography, Van Nostrand Co., 1962, page 156 relied upon.

NORMAN G. TORCHIN, *Primary Examiner.*

T. J. HOFFMANN, R. H. SMITH, *Assistant Examiners.*